US012634648B2

(12) United States Patent
Backman et al.

(10) Patent No.: US 12,634,648 B2
(45) Date of Patent: May 19, 2026

(54) HAND EMULATOR AND ACOUSTIC TESTING SYSTEM

(71) Applicant: AAC Technologies Pte. Ltd., Singapore (SG)

(72) Inventors: Juha Backman, Tampere (FI); Lauri Veko, Tampere (FI); Timo Lamberg, Tampere (FI)

(73) Assignee: AAC Technologies Pte. Ltd., Singapore (SG)

( * ) Notice: Subject to any disclaimer, the term of this patent is extended or adjusted under 35 U.S.C. 154(b) by 158 days.

(21) Appl. No.: 18/783,466

(22) Filed: Jul. 25, 2024

(65) Prior Publication Data

US 2026/0032397 A1    Jan. 29, 2026

(51) Int. Cl.
  H04R 29/00 (2006.01)
  G09B 23/14 (2006.01)
(52) U.S. Cl.
  CPC ........... H04R 29/001 (2013.01); G09B 23/14 (2013.01); H04R 29/004 (2013.01)
(58) Field of Classification Search
  CPC ...... H04R 29/004; H04R 29/001; H04R 3/04; H04R 29/00; H04S 7/301; H04S 7/302
  See application file for complete search history.

(56) References Cited

U.S. PATENT DOCUMENTS

2008/0151982 A1 * 6/2008 Qi ...................... G01R 29/0857
                                                          375/227

FOREIGN PATENT DOCUMENTS

EP        1455193 A2 * 9/2004 ......... G01R 29/0814
JP     2002107396 A * 4/2002

* cited by examiner

*Primary Examiner* — Kile O Blair
(74) *Attorney, Agent, or Firm* — Wiersch Law Group

(57) ABSTRACT

Provided is a hand emulator and an acoustic testing system. The hand emulator includes: a main support configured to support a device under test, the main support includes a palm, a thumb, an index finger, a middle finger, a ring finger and a little finger that are movably arranged at an end of the palm; a stopper including a plurality of limit pillars, at least some of the plurality of limit pillars are arranged on the palm, several limit pillars of the plurality of limit pillars enclose to form an accommodating space, and the device under test is limited within the accommodating space. The hand emulator can measure the frequency response of the speaker and/or the microphone of the device under test, emulate acoustic characteristics similar to the user's hand, and accurately and repetitively position the device under test, which improves existing measurement standards and creates new testing methods.

10 Claims, 12 Drawing Sheets

100

100

A–A

A–A

HAND EMULATOR AND ACOUSTIC TESTING SYSTEM

TECHNICAL FIELD

The present disclosure relates to the field of device testing technologies and, in particular, to a hand emulator and an acoustic testing system.

BACKGROUND

In the related art, a problem with testing and measurement of portable audio devices is that the currently used measurement standards ignore the effect of the user's hands on the frequency response, both for loudspeaker playback and microphone response, in both handset use (traditional telephony) and in various loudspeaker applications, such as telephony and teleconferencing, audiovisual media playback, and gaming.

Frequency response measurement of loudspeaker playback made from real usage situations indicate that the user's hands have a strong effect on the frequency response, spatial distribution of the sound, and in stereophonic use, also on the channel balance.

To address the challenges of improving the realism of portable audio device testing and development, a hand emulator with acoustic and vibration characteristics similar to the user's hand is needed, which can accurately and repetitively locate the device under test.

SUMMARY

The purpose of the present disclosure is to provide a hand emulator and an acoustic testing system to solve technical problems in related art, which can emulate acoustic and vibration characteristics similar to the user's hand and accurately and repetitively position the device under test.

In a first aspect, the present disclosure provides a hand emulator, including: a main support configured to support a device under test, the main support includes a palm, a thumb, an index finger, a middle finger, a ring finger and a little finger that are movably arranged at an end of the palm; a stopper including a plurality of limit pillars, at least some of the plurality of limit pillars are arranged on the palm, several limit pillars of the plurality of limit pillars enclose to form an accommodating space, and the device under test is limited within the accommodating space.

As an improvement, each of the thumb, the index finger, the middle finger, the ring finger, and the little finger has one or more knuckles, and relative rotation is possible between the knuckles and the palm or between adjacent knuckles.

As an improvement, several limit pillars of the plurality of limit pillars at least include a first limit pillar group and a second limit pillar group, the limit pillars of the first limit pillar group is movable along a first direction, the limit pillars of the second limit pillar group is movable along a second direction, and the first direction is perpendicular to the second direction.

As an improvement, the plurality of limit pillars further include a third limit pillar group, the limit pillars of the third limit pillar is movable along a third direction, and the third direction intersects with the first direction and the second direction.

As an improvement, the stopper further includes a flexible bracket, one end of the flexible bracket is connected to the main support, and the other end of the flexible bracket is provided with multiple limit pillars of the plurality of limit pillars.

As an improvement, an accommodating chamber is formed by recessing into the palm, and an interchangeable module is detachably arranged in the accommodating chamber, and different interchangeable modules have different recess contours on a side away from the palm.

As an improvement, a first surface is formed on the palm, and the first surface is connected to a depth adjustment member, and the depth adjustment member is configured to adjust a depth of the recess on the first surface.

In a second aspect, the present disclosure provides an acoustic testing system, including: a hand emulator as described above and an acoustic testing device, the hand emulator is configured to support a device under test, the acoustic testing device includes a processor, a microphone, and a speaker, the device under test is in signal communication with the processor, and the processor is in signal communication with the microphone and/or the speaker.

As an improvement, the system further includes a body emulator and a connector, opposite ends of the connector are respectively connected to the body emulator and the hand emulator, so that the hand emulator is maintained in a predetermined position with a predetermined posture.

As an improvement, two hand emulators are provided, and the two hand emulators are arranged relative to each other along a predetermined direction, each hand emulator is movable back and forth in the predetermined direction to approach or move away from the other hand emulator.

Compared with existing technology, the present disclosure improves the practical usability of acoustic testing for any portable device, including mobile phones, smartphones, and tablets, by setting a hand emulator that mimics the shape of a human hand and equipping it with a stopper for limiting the device under test. The hand emulator can be configured to measure the frequency response of the speaker and/or microphone of the device under test, emulate acoustic characteristics similar to the user's hand, and accurately and repetitively position the device under test, which can serve as a basis for improving existing measurement standards and creating new testing methods.

REFERENCE SIGNS

100—hand emulator, 101—palm, 102—thumb, 103—index finger, 104—middle finger, 105—ring finger, 106—little finger, 107—limit pillar, 108—guide groove, 109—flexible bracket, 110—accommodating chamber, 111—interchangeable module, 112—first surface, 113—depth adjustment member;

200—acoustic testing system, 201—processor, 202—microphone; 203—speaker;

300—body emulator;

400—connector, 401—first connection block, 402—second connection block;

500—slide rail;

600—device under test;

D1—first direction;

D2—second direction;

D3—third direction.

DESCRIPTION OF EMBODIMENTS

Embodiments described below with reference to the accompanying drawings are illustrative and only intended to explain the present disclosure, and shall not be interpreted as limitations to the present disclosure.

As shown in FIGS. 1 to 9, embodiments of the present disclosure provide a hand emulator 100. The hand emulator 100 includes a main support and a stopper.

Figure 1:
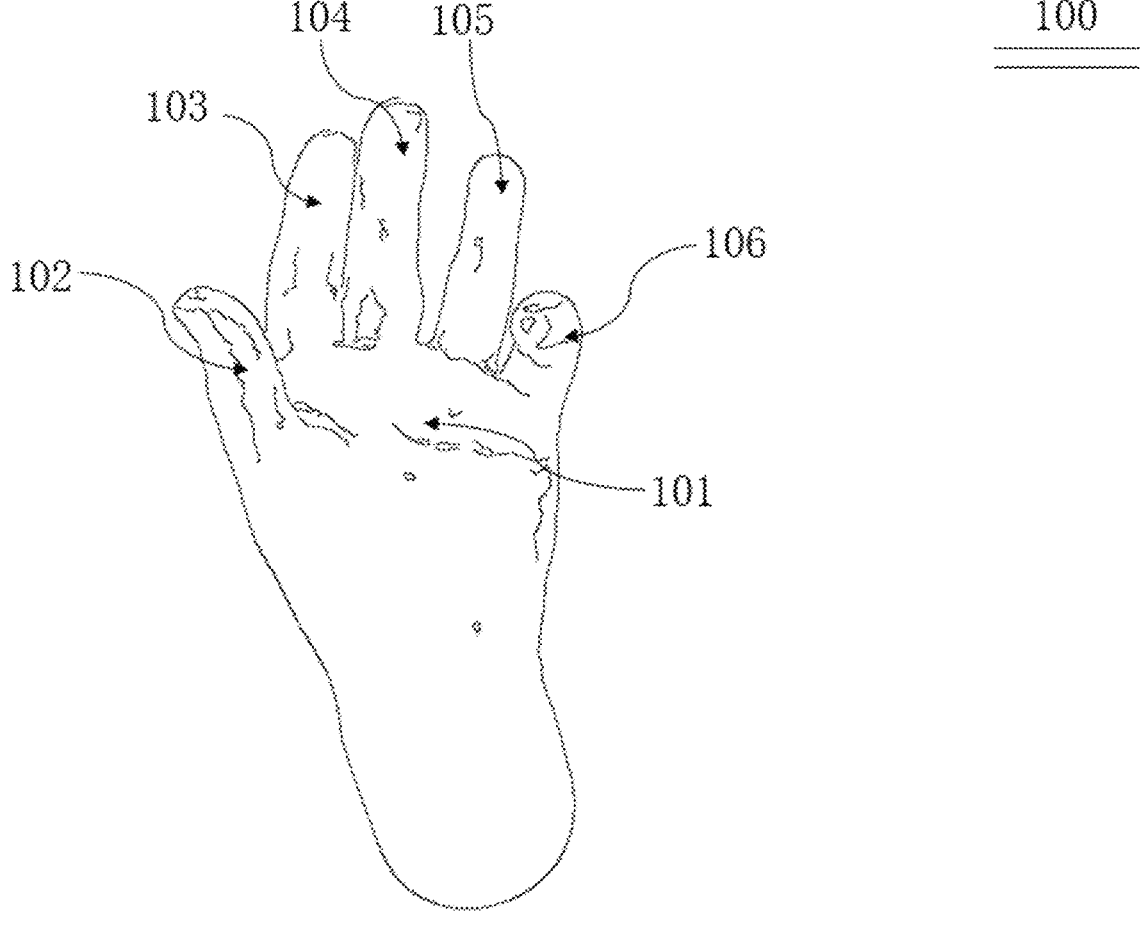
FIG. 1 is a schematic structural diagram of a hand emulator in a hidden stopper state according to an embodiment of the present disclosure.
Figure 2:
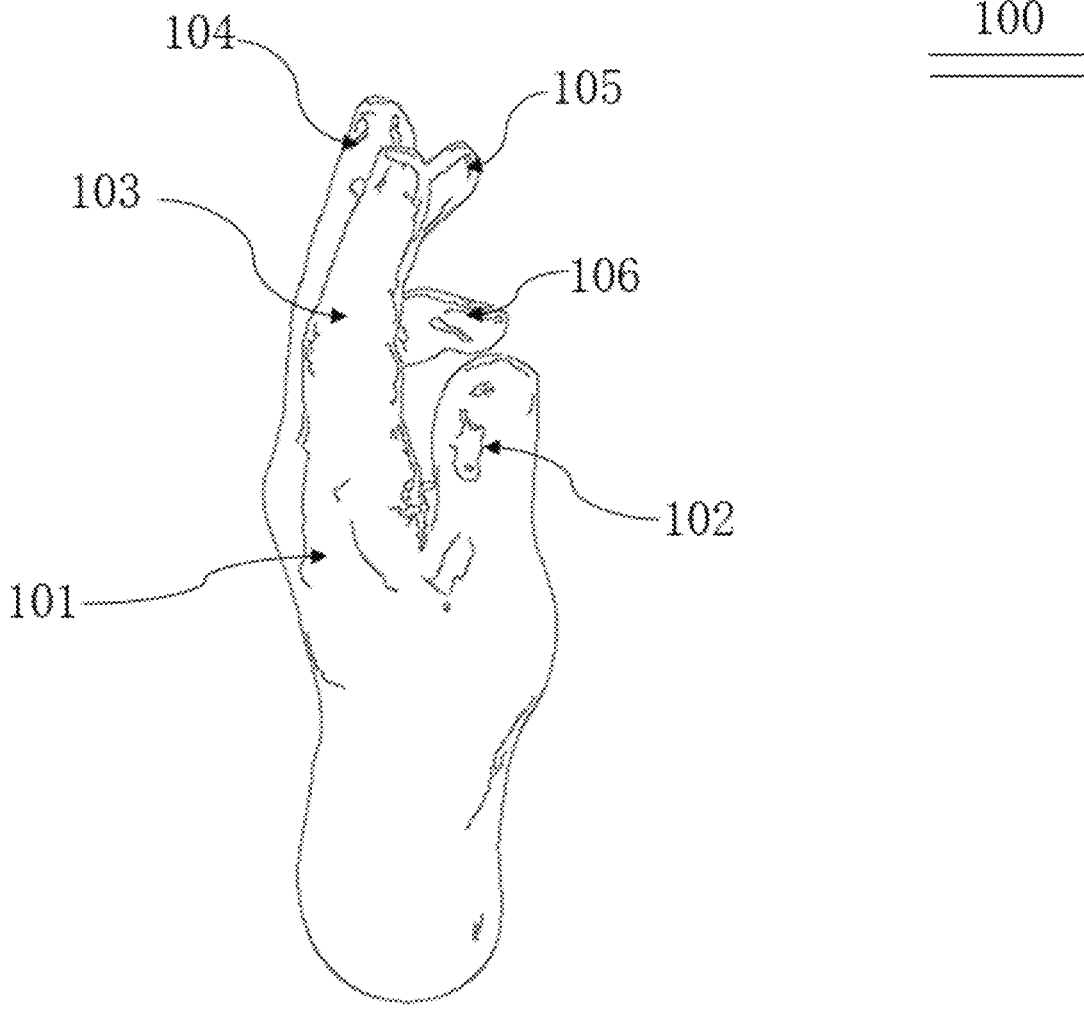
FIG. 2 is a schematic structural diagram of a hand emulator in a hidden stopper state according to another embodiment of the present disclosure.

The main support is configured to support the device 600 under test. The device 600 under test includes but is not limited to mobile devices such as mobile phones, smartphones, and tablets. As shown in FIGS. 1 and 2, the main support includes a palm 101 and a thumb 102, an index finger 103, a middle finger 104, a ring finger 105, and a little finger 106 movably arranged at an end of the palm 101. Those skilled in the art can understand that the main support can mimic the shape of a human hand in great detail (such as based on scanning of a real hand) or have a partially simplified structure, where only acoustically related features such as the overall width of the hand, approximate shape of the fingers, and general curvature of the palm 101 are reproduced, which is not limited herein.

Figure 3:
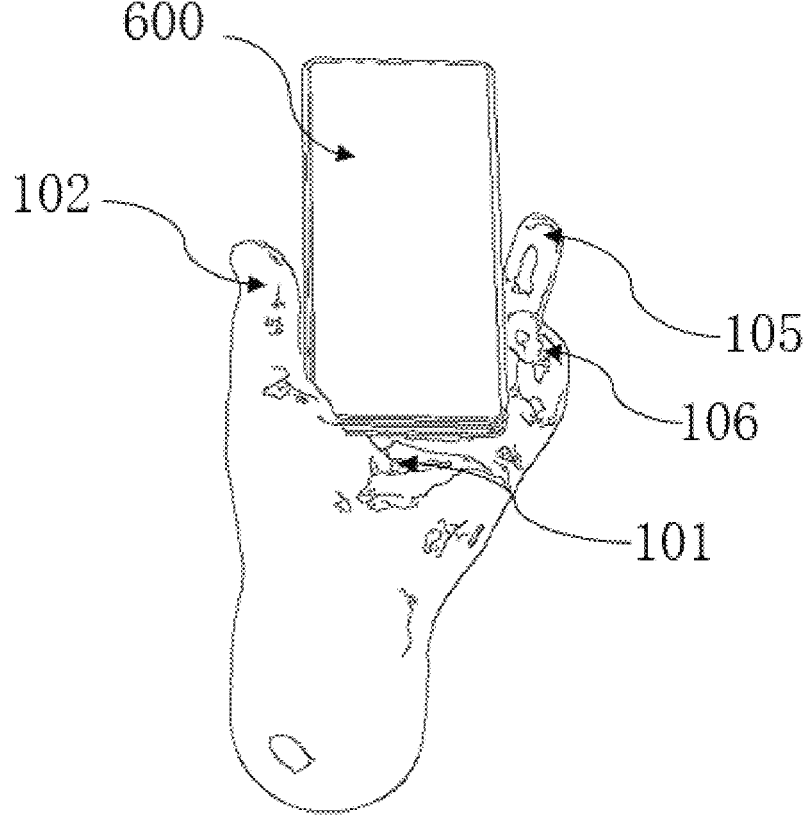
FIG. 3 is a schematic structural diagram of a device under test placed on a hand emulator.

As shown in FIG. 3, when the device 600 under test is placed on the main support, the palm 101 supports the device 600 under test. The thumb 102, index finger 103, middle finger 104, ring finger 105, and little finger 106 can emulate the state of a person holding the device 600 under test in a real environment, so that the frequency response of the speaker 203, microphone 202, or both of the device 600 under test can emulate acoustic characteristics similar to the user's hand.

Figure 4:
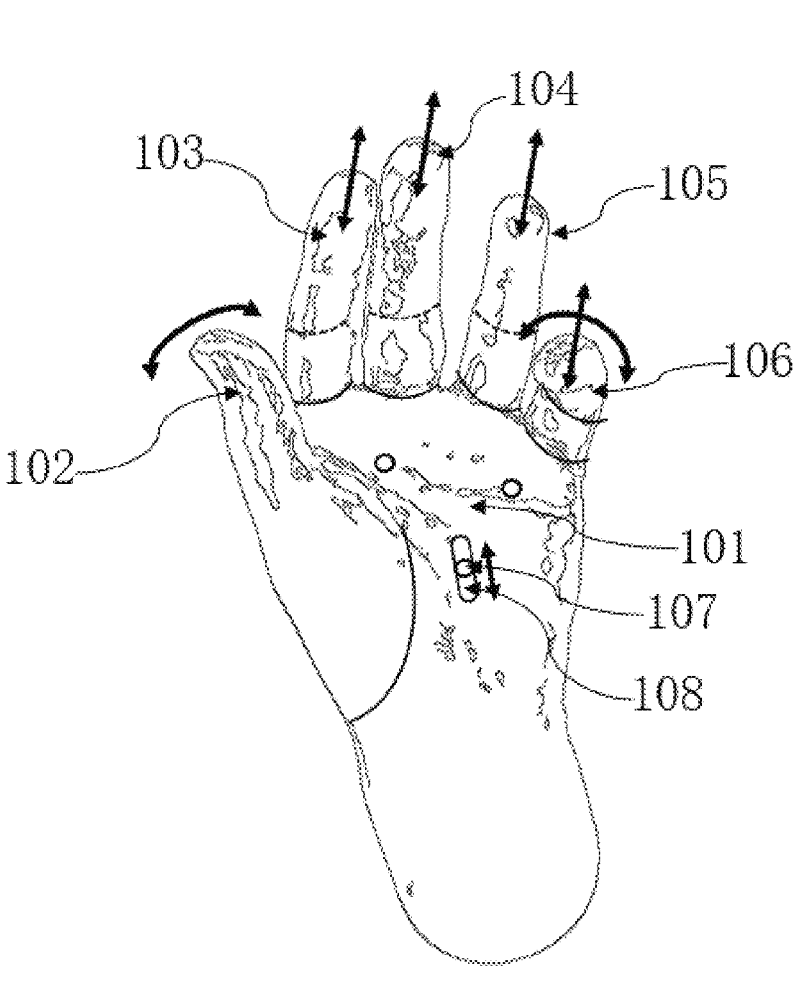
FIG. 4 is a schematic structural diagram of a hand emulator with a stopper having a first structure.
Figure 5:
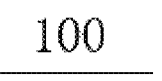
FIG. 5 is a schematic structural diagram of a hand emulator with a stopper having a second structure.
Figure 5:
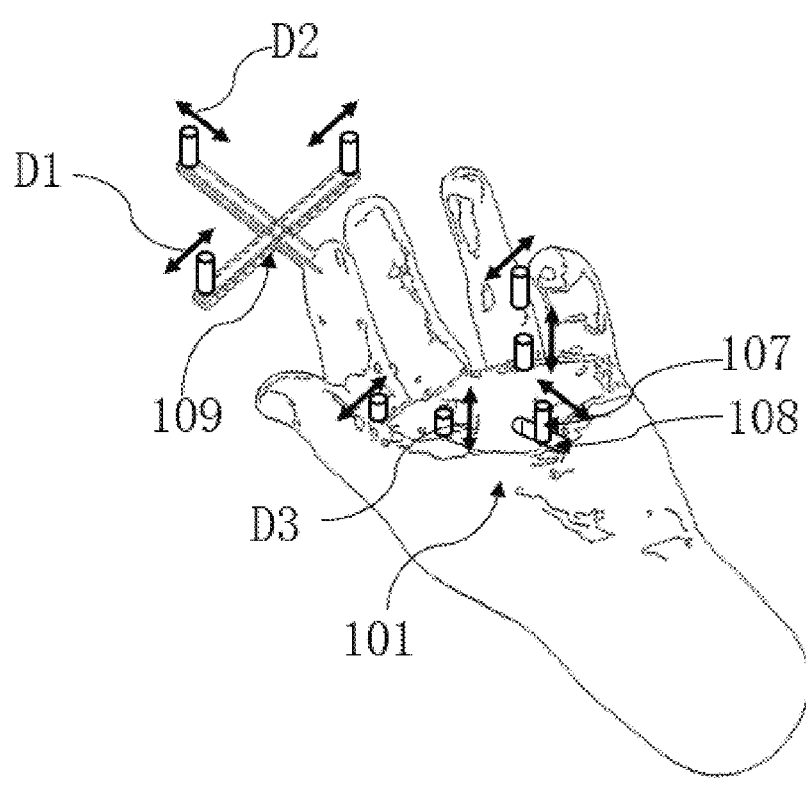

As shown in FIGS. 4 and 5, the stopper is configured to limit the device 600 under test, avoiding it from falling out of the main support. In an embodiment, the stopper includes a plurality of limit pillars 107, at least some of which are arranged on the palm 101. In addition, according to the size and shape characteristics of the device 600 under test, multiple limit pillars 107 can be arranged outside the main support, which is not limited herein. Several limit pillars 107 are enclosed to form an accommodating space. When the device 600 under test is supported on the palm 101, the outer contour of the device 600 under test is in contact with the limit pillars 107, and the device 600 under test is limited within the accommodating space, so as to accurately and repetitively position the device 600 under test, thereby improving the actual availability of acoustic testing for any portable device.

As shown in FIG. 4, in some embodiments, the thumb 102, index finger 103, middle finger 104, ring finger 105, and little finger 106 all have one or more knuckles, and relative rotation is possible between the knuckles and the palm 101, as well as between adjacent knuckles. As a result, each finger has at least one degree of flexion and extension freedom, which can emulate human hand movements, so as to emulate the state of holding the device 600 under test in reality, or the fingers (such as thumb 102) can move on the device screen to emulate screen interaction, such as in during gaming.

When the device 600 under test is a mobile phone, the thumb 102 and little finger 106 can rotate to generate essentially horizontal movement, so that the device under test can be grasped by two fingers, and the remaining three fingers (index finger 103, middle finger 104, ring finger 105) can remain stationary to form a plane. Alternatively, they can use one or more flexible joints to move, allowing for adjustment of fingertip position to accommodate different measurement positions or device shapes.

In an embodiment, the thumb 102 has rotation and flexion degrees of freedom, while other fingers (index finger 103, middle finger 104, ring finger 105, and little finger 106) have two flexion degrees of freedom. Flexion degrees of freedom refer to the flexion and extension of each finger's knuckles relative to the palm 101 or other knuckles, and rotation degrees of freedom refer to the overall rotation of the thumb 102 relative to the palm 101.

The above flexion and extension movements can be achieved through a hinge structure. In a typical example, the hinge structure includes a pivot and adapters that are rotationally connected to the pivot. Each adapter is connected to the palm 101 or the knuckles, allowing the palm 101 or knuckles to be hinged through the pivot.

The action of rotation can be achieved through a worm gear structure. In a typical example, the worm gear structure includes a driving motor, a worm gear, and a worm. The output end of the driving motor is connected to the worm, and the root of the thumb 102 is connected to the worm gear. The worm meshes with the worm gear to drive the driving motor to rotate, which can in turn drive the rotation of the thumb 102 relative to the palm 101.

Furthermore, the surface of the emulator 100 can be fully or partially coated with a material that resembles the vibration characteristics such as compliance and vibration damping, to prevent rattle from the vibration of the device 600 under test, and to emulate the acoustical reflection characteristics of human hand tissue. Partial coating can be applied to the tips of the fingers and/or to the palm 101. Suitable coating materials include various plastic and rubber materials. The surface material can be selected to have high surface friction to ease the mounting of the device 600 under test.

The hand emulator 100 can be equipped with vibration sensing elements (accelerometers etc.) to enable the use of the hand also for evaluating haptic actuator functionality or the vibration caused by the audio transducers. The hand emulator 100 can be also equipped with built-in microphones that can be used e.g. for calibration purposes or for evaluating the near-field distribution of the sound generated by the device 600 under test.

In embodiments provided in the present disclosure, the limit pillars 107 are arranged on the palm 101 in a movable connection manner to adapt to different sizes and shapes of the device 600 under test. In an embodiment, as shown in FIGS. 4 and 5, the movable connection manner can be a concave surface of the palm 101 with a guide groove 108, and the clearance of the limit pillar 107 is matched with the guide groove 108. The guide groove 108 plays a fixed and guiding role, so that the limit pillar 107 can only move back and forth along the extension direction of the guide groove 108. Those skilled in the art can understand, other manners which can also achieve the movable connection manner are possible, which is not limited herein, as long as the limit pillar 107 can move back and forth along the extension direction of the guide groove 108 and maintain the preset position on the moving path.

The movement of the limit pillar 107 can change the size and shape of the interior space of the accommodating space, thereby adapting to different sizes and shapes of the device 600 under test. After the device 600 under test is placed on the palm 101, the outer contour of the device 600 under test is in contact with the limit pillars 107, which is held in the predetermined position, thus accurately and repetitively positioning the device 600 under test.

Referring to FIGS. 4 and 5, the plurality of limit pillars 107 at least include a first limit pillar group and a second limit pillar group. The limit pillars 107 in the first limit pillar group can move along the first direction D1, while the limit pillars 107 in the second limit pillar group can move along the second direction D2. The first direction D1 is perpendicular to the second direction D2, and the first direction D1 is defined as the left and right directions in the drawings, which refers to the width direction of the palm 101. The second direction D2 is defined as the up and down direction in the drawings, which refers to the length direction of the palm 101.

The limit pillars 107 in the first limit pillar group are provided in pairs and are connected to the left and right sides of the device 600 under test for positioning and limiting the device 600 under test in the width direction of the palm 101. By moving the limit pillars 107 in the first limit pillar group along the first direction D1, the devices 600 under test of different widths can be limited. In addition, multiple pairs of limit pillars 107 can be arranged in the second direction D2 to provide more stable clamping and limiting for the device 600 under test. Those skilled in the art can understand that the number and distribution of limit pillars 107 in the first limit pillar group can be determined based on the size and contour of the device 600 under test. There are no restrictions here.

At least one limit pillar 107 of the second limit pillar group is in contact with the bottom of the device 600 under test, and at least one limit pillar 107 is in contact with the top of the device 600 under test, thereby positioning and limiting the device 600 under test in the length direction of the palm 101. By moving the limit pillar 107 of the second limit pillar group along the second direction D2, devices 600 under test of different lengths can be limited. Those skilled in the art can understand that the number and distribution of limit pillars 107 in the second limit pillar group can be determined based on the size and contour of the device 600 under test, which is not limited herein.

Furthermore, as shown in FIG. 5, the plurality of limit pillars 107 further include a third limit pillar group. The limit pillars 107 of the third limit pillar 107 can move along a third direction D3, and the third direction D3 intersects with the first direction D1 and the second direction D2. The movement direction of the limit pillars 107 in the third limit pillar group tilts towards the first direction D1 and the second direction D2 to support arc-shaped corner ends of the device 600 under test, or to adapt to or support the irregular side ends of the device 600 under test. Those skilled in the art can understand that the number and distribution of limit pillars 107 in the third limit pillar group can be determined based on the size and contour of the device 600 under test, which is not limited herein.

In order to ensure the controlled and good repeatability of the device 600 under test, and to distribute the mechanical stress on the palm 101 and the device 600 under test to a large number of contact points. In embodiments provided in the present disclosure, as shown in FIG. 5, the stopper further includes a flexible bracket 109. One end of the flexible bracket 109 is connected to the main support, and the other end of the flexible bracket 109 is provided with multiple limit pillars 107. In an embodiment, the flexible bracket 109 is a "cross" shaped structure, and one end of the flexible bracket 109 in the second direction D2 is connected to the palm 101 or one of the fingers, while the other end of the flexible bracket 109 in the second direction D2 is connected to one limit pillar 107 in the second limit pillar group. Both ends of the flexible bracket 109 in the first direction D1 are provided with a pair of limit pillars 107 of the first limit pillar group. As a result, it is possible to position and limit the top of the device 600 under test and the two sides of the top of the device 600 under test.

The shape of the palm 101 has been found in user tests to be a significant factor in determining the high-frequency response of a portable device. To measure the effects of the palm 101 shape, the predetermined area of the palm can be variable in embodiment of the present disclosure.

Figure 6:
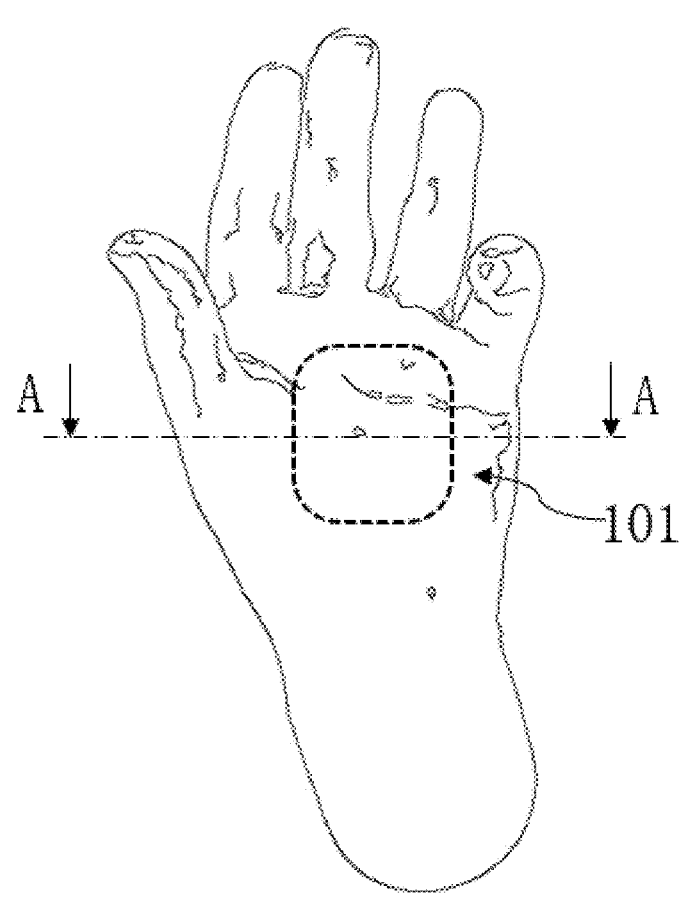
FIG. 6 is a schematic structural diagram of a hand emulator with an interchangeable module.
Figure 7:
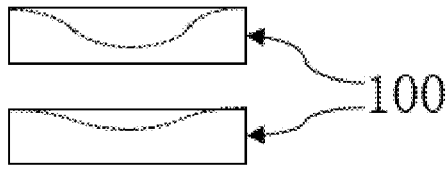
FIG. 7 is a schematic structural diagram of a different interchangeable module.
Figure 8:
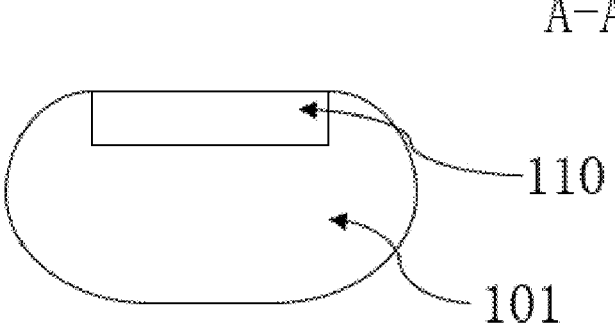
FIG. 8 is a schematic structural diagram of an accommodating chamber for accommodating the interchangeable modules.
Figure 9:
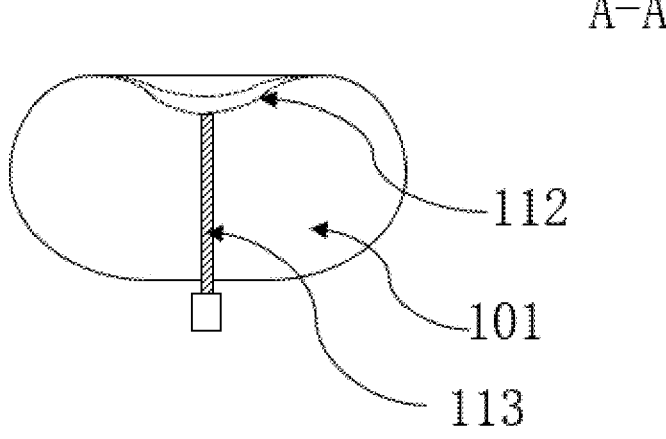
FIG. 9 is a schematic structural diagram of an adjustable first surface.

In an embodiment, as shown in FIGS. 6 to 8, different shapes of palm 101 are provided through the interchangeable modules 111. An accommodating chamber 110 is provided by recessing in the palm 101, and an interchangeable module 111 is provided inside the accommodating chamber 110. The interchangeable module 111 can be fixed in a detachable manner through various methods such as embedding, clamping, and threaded connection, which is not limited herein. Different interchangeable modules 111 have different recessed contours on the side away from palm 101. The shape and depth of the recessed contours of different interchangeable modules 111 are different from each other. By replacing the interchangeable module 111, it is convenient and quick to provide palm 101 with different shapes and contours for the device 600 under test, thereby facilitating the acoustic testing of the device 600 under test.

In another embodiment, as shown in FIG. 8, a first surface 112 is formed on the palm 101, which is located in a predetermined area of the palm 101, preferably in the central area. The first surface 112 is connected to a depth adjustment member 113, which is configured to adjust the recessing depth of the first surface 112. The depth adjustment member 113 can be hidden inside the palm 101, and thus the structural design is more compact. For example, the depth adjustment member 113 includes a screw rod and a screw nut. One end of the screw rod is connected to the first surface 112, and the other end of the screw rod is threadedly connected to the screw nut. The screw nut is placed inside the palm 101. The driving member drives the screw nut to rotate, thereby driving the screw rod to move back and forth. As a result, the depth of recess on the first surface 112 can be adjusted, it is convenient and quick to provide palm 101 with different shapes and contours for the device 600 under test, thereby facilitating the acoustic testing of the device 600 under test.

Figure 13:
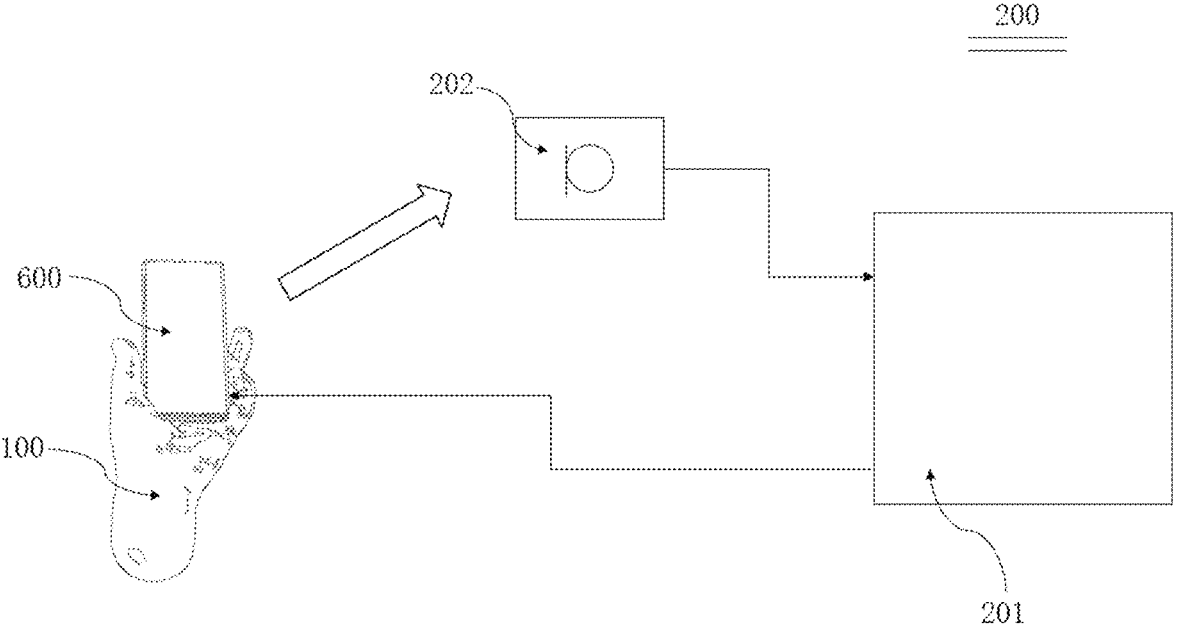
FIG. 13 is a schematic structural diagram of an acoustic testing system with a microphone.
Figure 14:
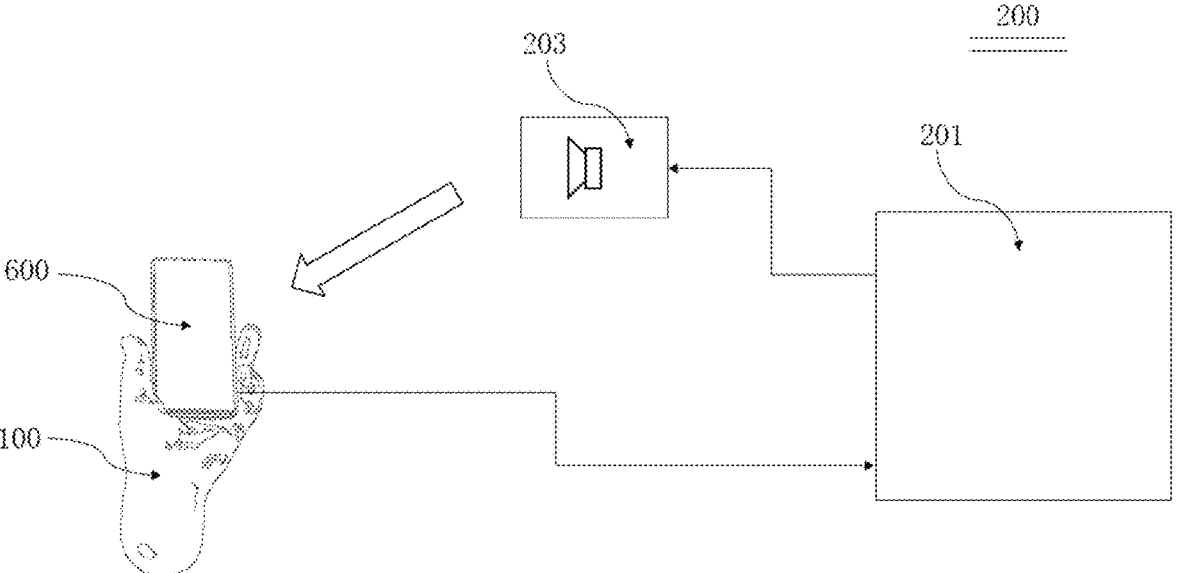
FIG. 14 is a schematic structural diagram of an acoustic testing system with a speaker.

Based on the hand emulator 100 provided in the above embodiments, as shown in FIGS. 13 and 14, the present disclosure also provides an acoustic testing system 200. The acoustic testing system 200 includes a hand emulator 100 and an acoustic testing device. The hand emulator 100 is the aforementioned hand emulator 100, which is configured to support the device 600 under test. The acoustic testing device includes a processor 201, a microphone 202, and a speaker 203. The device 600 under test is in signal communication with the processor 201, and the processor 201 is in signal communication with the microphone 202 and/or speaker 203.

As shown in FIG. 13, the processor 201 is in signal communication with the microphone 202. After the device 600 under test produce a sound, the microphone 202 detects the sound of the device 600 under test, and processor 201 performs acoustic testing on different types of mobile terminals.

As shown in FIG. 14, the processor 201 is connected to the speaker 203, the speaker 203 can play the test sound source signal. After receiving the test sound source signal, the device 600 under test can output the test sound source signal to the processor 201, and then the processor 201 performs judgment and analysis to achieve testing of the device 600 under test.

Figure 10:
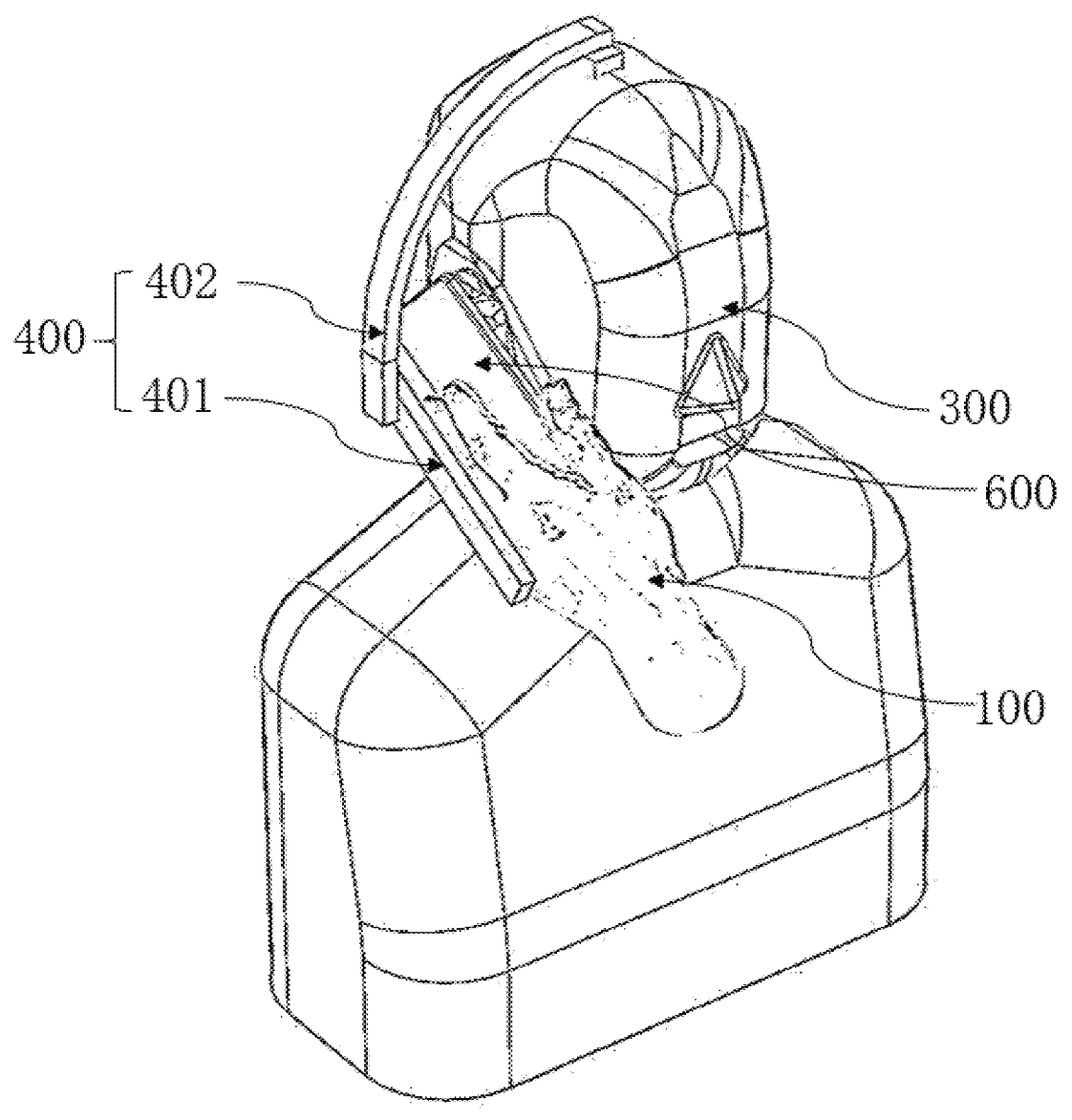
FIG. 10 is a schematic structural diagram of a hand emulator and a body emulator in a first connection state.
Figure 11:
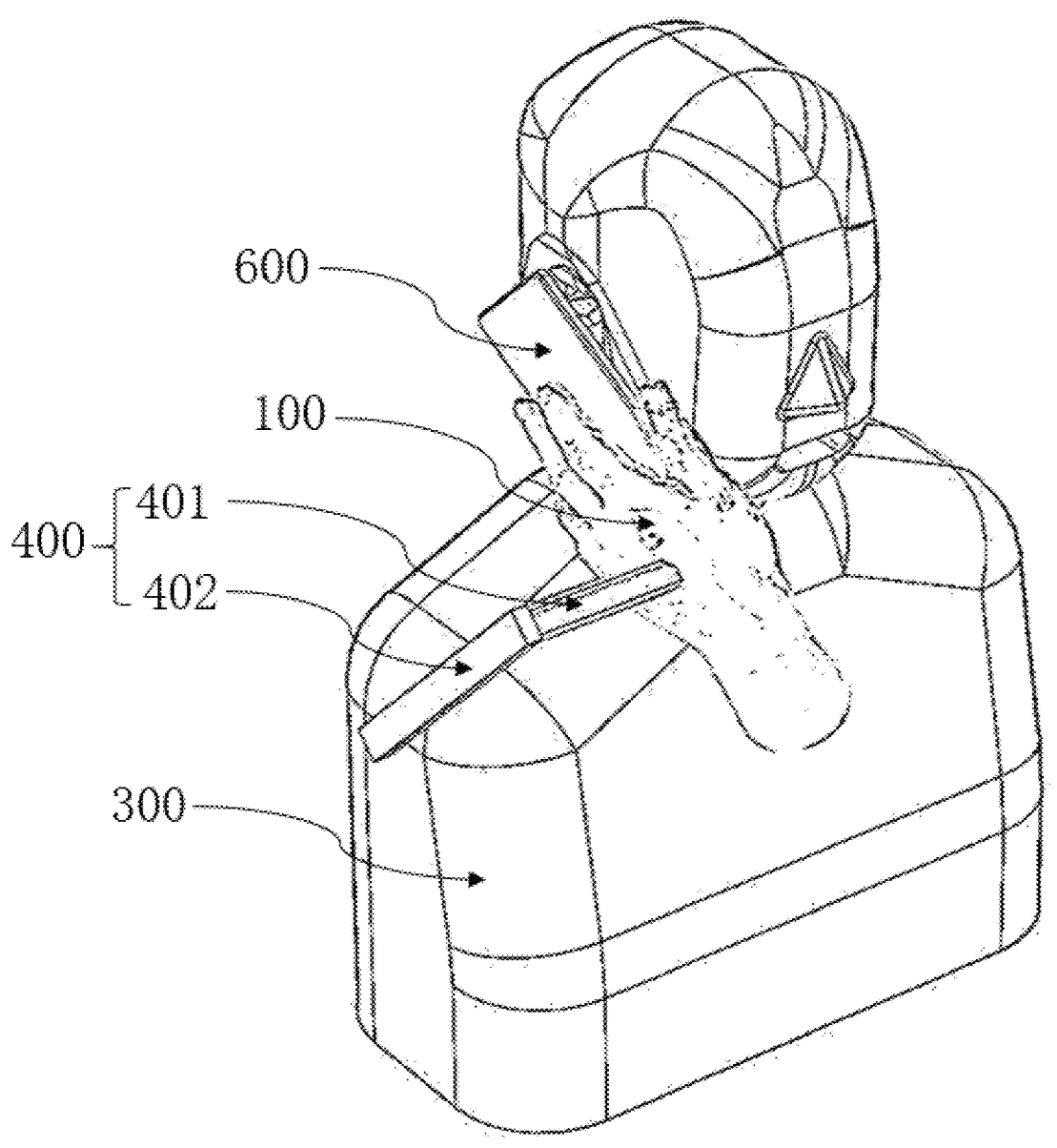
FIG. 11 is a schematic structural diagram of a hand emulator and a body emulator in a second connection state.

Furthermore, as shown in FIGS. 10 and 11, a body emulator 300 and a connector 400 are also provided. The body emulator 300 can emulate at least the head and upper torso of the human body, and the opposite ends of the connector 400 are respectively connected to the body emulator 300 and the hand emulator 100, so that the hand emulator 100 maintains a predetermined posture in a predetermined position. The hand emulator 100 may be used in conjunction with the body emulator 300 or other recording devices to record audio test samples for subjective hearing testing and may be used in conjunction with the acoustic testing system 200 to evaluate the spatial quality of reproduced sound.

In embodiments provided in the present disclosure, the connector 400 positions the hand emulator 100 on the body emulator 300 near the ear, and is configured to emulate a real scenario when answering a phone call. The hand emulator 100 can maintain a predetermined posture at this predetermined position to perform comparative testing on different devices 600 under test in the same condition.

In an embodiment, as shown in FIGS. 10 and 11, the connector 400 includes a first connection block 401 and a second connection block 402. One end of the first connection block 401 is connected to the hand emulator 100, the other end of the first connection block 401 is connected to one end of the second connection block 402, and the other end of the second connection block 402 is connected to the head or upper torso of the body emulator 300.

Figure 12:
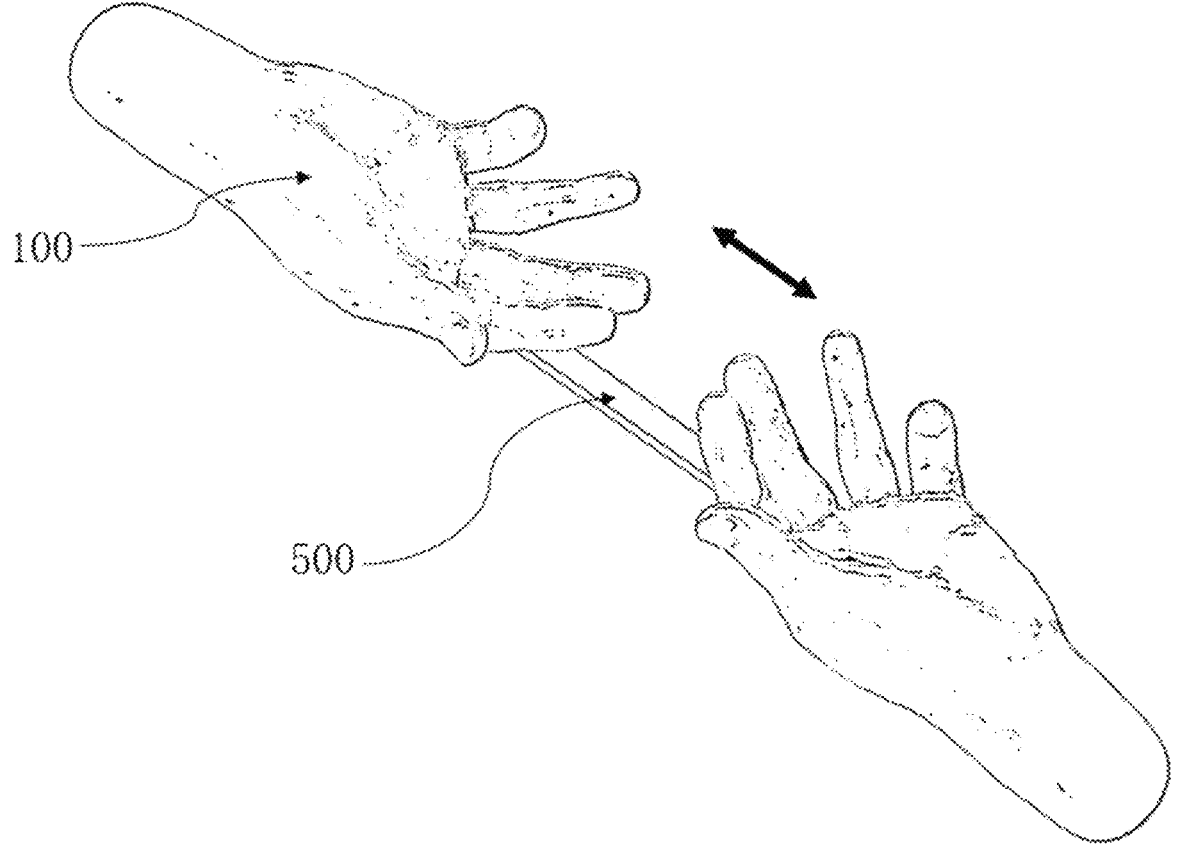
FIG. 12 is a schematic structural diagram of two hand emulators arranged in relative positions.

To emulate the situation of holding the device 600 under test with both hands, in an embodiment provided in the present disclosure, as shown in FIG. 12, two hand emulators 100 can be provided. The two hand emulators 100 can be arranged relative to one slide rail 500 along a predetermined direction, and the hand emulators 100 can move back and forth along the extension direction of the slide rail 500. The two hand emulators 100 jointly support the device 600 under test, which can be a large mobile terminal such as a tablet, which is not limited herein. The hand emulator 100 can move back and forth along the predetermined direction to approach or move away from the other hand emulator 100. The distance between the two hand emulators 100 can be adjusted to adapt to various sizes and shapes of the devices 600 under test.

The acoustic testing system 200 provided in the present disclosure can be configured to measure the frequency response of the speaker 203, microphone 202, or both of the device 600 under test by setting a hand emulator 100 that mimics the shape of a human hand. It can emulate acoustic characteristics similar to the user's hand and accurately and repetitively position the device 600 under test, thereby improving the actual usability of acoustic testing for any portable device, including mobile phones, smartphones, tablets, etc. It can serve as a basis for improving existing measurement standards and creating new testing methods.

The above embodiments based on the drawings provide a detailed explanation of the structure, features, and effects of the present disclosure. The above are only some embodiments of the present disclosure, but the scope is not limited by the embodiments shown in the drawings. Any changes made according to the concept of the present disclosure, or equivalent embodiments modified to equivalent changes that do not exceed the scope of protection covered by the description and drawings shall be within the scope of protection of the present disclosure.

What is claimed is:

1. A hand emulator, comprising:
a main support configured to support a device under test, wherein the main support comprises a palm, a thumb, an index finger, a middle finger, a ring finger and a little finger that are movably arranged at an end of the palm;
a stopper comprising a plurality of limit pillars, wherein at least some of the plurality of limit pillars are arranged on the palm, several limit pillars of the plurality of limit pillars enclose to form an accommodating space, and the device under test is limited within the accommodating space.

2. The hand emulator as described in claim 1, wherein each of the thumb, the index finger, the middle finger, the ring finger, and the little finger has one or more knuckles, and relative rotation is possible between the knuckles and the palm or between adjacent knuckles.

3. The hand emulator as described in claim 1, wherein several limit pillars of the plurality of limit pillars at least comprise a first limit pillar group and a second limit pillar group, the limit pillars of the first limit pillar group is movable along a first direction, the limit pillars of the second limit pillar group is movable along a second direction, and the first direction is perpendicular to the second direction.

4. The hand emulator as described in claim 3, wherein the plurality of limit pillars further comprise a third limit pillar group, the limit pillars of the third limit pillar is movable along a third direction, and the third direction intersects with the first direction and the second direction.

5. The hand emulator as described in claim 1, wherein the stopper further comprises a flexible bracket, one end of the flexible bracket is connected to the main support, and the other end of the flexible bracket is provided with multiple limit pillars of the plurality of limit pillars.

6. The hand emulator as described in claim 1, wherein an accommodating chamber is formed by recessing into the palm, and an interchangeable module is detachably arranged in the accommodating chamber, and different interchangeable modules have different recess contours on a side away from the palm.

7. The hand emulator as described in claim 1, wherein a first surface is formed on the palm, and the first surface is connected to a depth adjustment member, and the depth adjustment member is configured to adjust a depth of the recess on the first surface.

8. An acoustic testing system, comprising a hand emulator as described in claim 1 and an acoustic testing device, wherein the hand emulator is configured to support a device under test, the acoustic testing device comprises a processor, a microphone, and a speaker, wherein the device under test is in signal communication with the processor, and the processor is in signal communication with the microphone and/or the speaker.

9. The acoustic testing system as described in claim 8, further comprising a body emulator and a connector, wherein opposite ends of the connector are respectively connected to the body emulator and the hand emulator, so that the hand emulator is maintained in a predetermined position with a predetermined posture.

10. The acoustic testing system as described in claim 8, wherein two hand emulators are provided, and the two hand emulators are arranged relative to each other along a predetermined direction, wherein each hand emulator is movable back and forth in the predetermined direction to approach or move away from the other hand emulator.

\* \* \* \* \*